Figure 1:
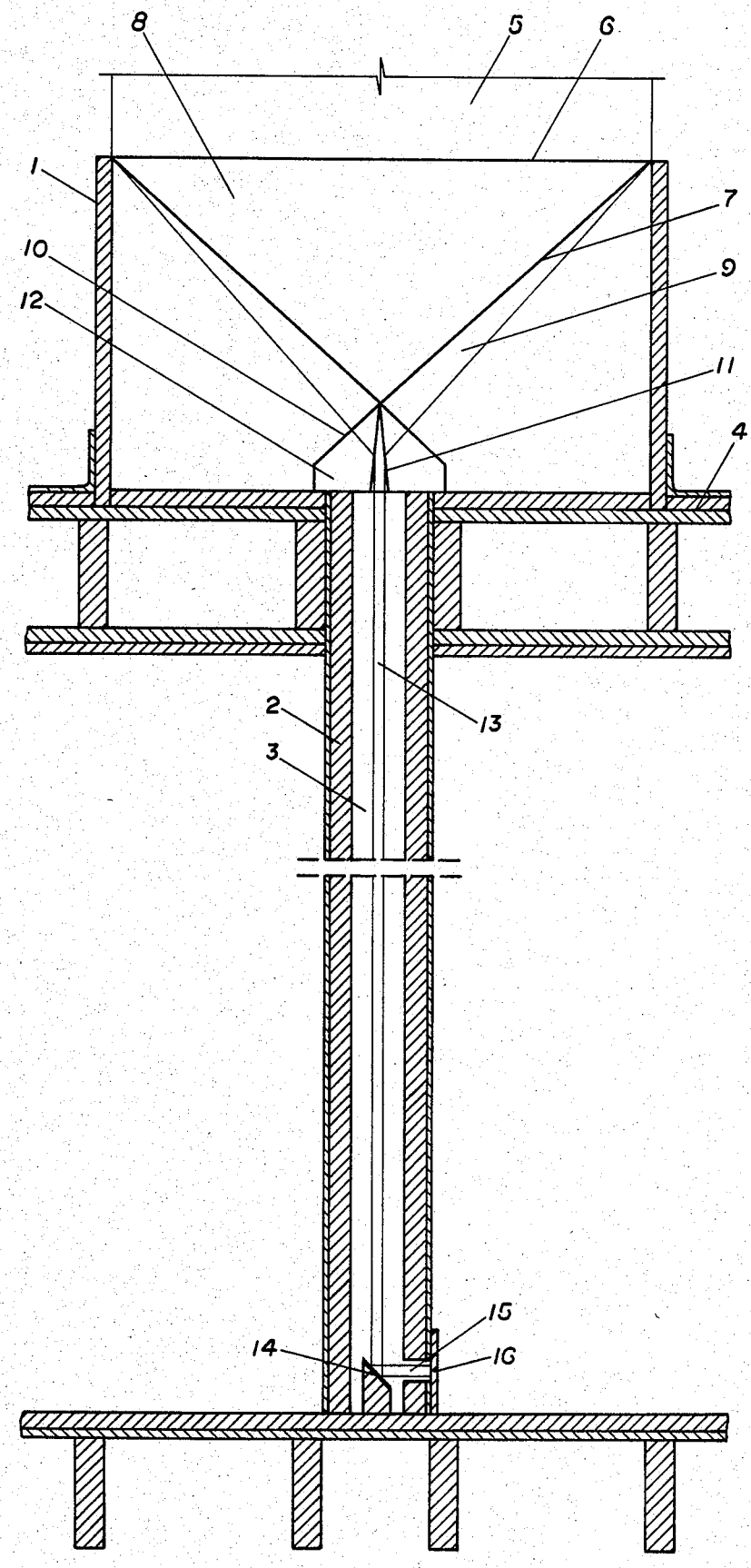

United States Patent [19]

Clegg

[11] Patent Number: 4,527,546

[45] Date of Patent: Jul. 9, 1985

[54] PRISMATIC WALL HEATER

[76] Inventor: John E. Clegg, 2320 Keystone Dr., Orlando, Fla. 32806

[21] Appl. No.: 636,668

[22] Filed: Aug. 1, 1984

[51] Int. Cl.³ .............................................. F24J 3/02
[52] U.S. Cl. .................................... 126/440; 126/438; 126/451; 353/81
[58] Field of Search ............... 126/440, 438, 441, 429, 126/428, 431, 451; 353/81

[56] References Cited

U.S. PATENT DOCUMENTS

| 4,139,286 | 2/1979 | Hein et al. | 353/3 |
| 4,333,713 | 6/1982 | Clegg | 126/440 X |
| 4,397,302 | 8/1983 | Moravnik | 126/440 |
| 4,411,490 | 10/1983 | Daniel | 126/440 X |
| 4,462,392 | 7/1984 | Tipton | 126/439 |

FOREIGN PATENT DOCUMENTS

| 2446450 | 9/1980 | France | 126/440 |
| 2041506 | 9/1980 | United Kingdom | 126/440 |

Primary Examiner—Margaret A. Focarino

[57] ABSTRACT

A prismatic beam concentrator mounted at the top of two adjacent walls so as to receive a rectangular incipient beam of diffused sunlight and emit a vertical concentrated sheet beam through a cavity between the walls to a mirror which reflects the beam at right angles onto a radiant iron bar at the base of one wall, as a source of supplemental household heat.

1 Claim, 1 Drawing Figure

PRISMATIC WALL HEATER

BACKGROUND

The prismatic beam concentrator is the subject of a copending application Ser. No. 649,577, filed Sept. 12, 1984 by this inventor.

Prior art includes the following patents:

1. *Collimating System,* U.S. Pat. No. 2,405,960, 8/20/46, E. H. Land. This device uses a single prism to enlarge and collimate a beam.

2. *Luminous Flux Diverging Apparatus Using Prisms,* Japan Pat. No. 119,260, 9/17/79, Kazuo Sanagi. This apparatus uses four single prisms to produce a concentrated sheet beam.

DRAWINGS

FIG. 1 is an elevation of the prismatic wall heater with a ray diagram.

DESCRIPTION

FIG. 1 shows the prismatic wall heater with prismatic beam concentrator 1 mounted at the top of two adjacent walls 2 which are separated by cavity 3 and which extend above roof line 4. Rectangular incipient beam 5 of diffused sunlight is received and transmitted by planar face 6 and refracted and emitted by two angular wedge faces 7 of upper component prism 8, forming two rectangular convergent beams 9.

Convergent beams 9 are received and transmitted by two angular wedge faces 10 and refracted and emitted by two angular V-groove faces 11 of lower component prism 12, forming vertical concentrated sheet beam 13 which is projected through cavity 3 to planar mirror 14 at the base of walls 2. Mirror 14 is inclined at an angle of 45° to vertical beam 13 so as to reflect horizontal reflected beam 15 which strikes radiant iron bar 16, which absorbs and radiates the heat of reflected beam 15.

The heat content of diffused sunlight is low, and for this reason the prismatic wall heater is designed to extend the entire length of the wall on which is is installed.

The invention can be converted to a source of illumination by replacing the radiant iron bar 16 with a frosted glass panel which is mounted near the ceiling.

I claim:

1. A prismatic wall heater comprising;
   a. A prismatic beam concentrator (1) mounted at the top of two adjacent walls (2) and comprising an upper component prism (8) with a planar face (6) which transmits and two angular wedge faces (7) which refract a rectangular incipient beam (5) of diffused sunlight, forming two rectangular convergent beams (9), and comprising a lower component prism (12) with two angular wedge faces (10) which transmit and two angular V-groove faces (11) which refract beams (9), forming vertical concentrated sheet beam (13),
   b. Two adjacent walls (2) separated by a cavity (3),
   c. A planar mirror (14) mounted in cavity (3) at the base of two adjacent walls (2) and inclined at an angle of 45° to vertical concentrated sheet beam (13) so as to reflect beam (13), forming horizontal reflected beam (15), and
   d. A radiant iron bar (16) mounted at the base of one wall (2) so as to intercept horizontal reflected beam (15) and absorb and radiate the heat thereof.

* * * * *